3,279,832
SEAL FOR BALL AND SOCKET JOINT
Walter Bergman, Livonia, Mich., assignor to Ford Motor Company, Dearborn, Mich., a corporation of Delaware
Filed Mar. 20, 1964, Ser. No. 353,474
5 Claims. (Cl. 287—87)

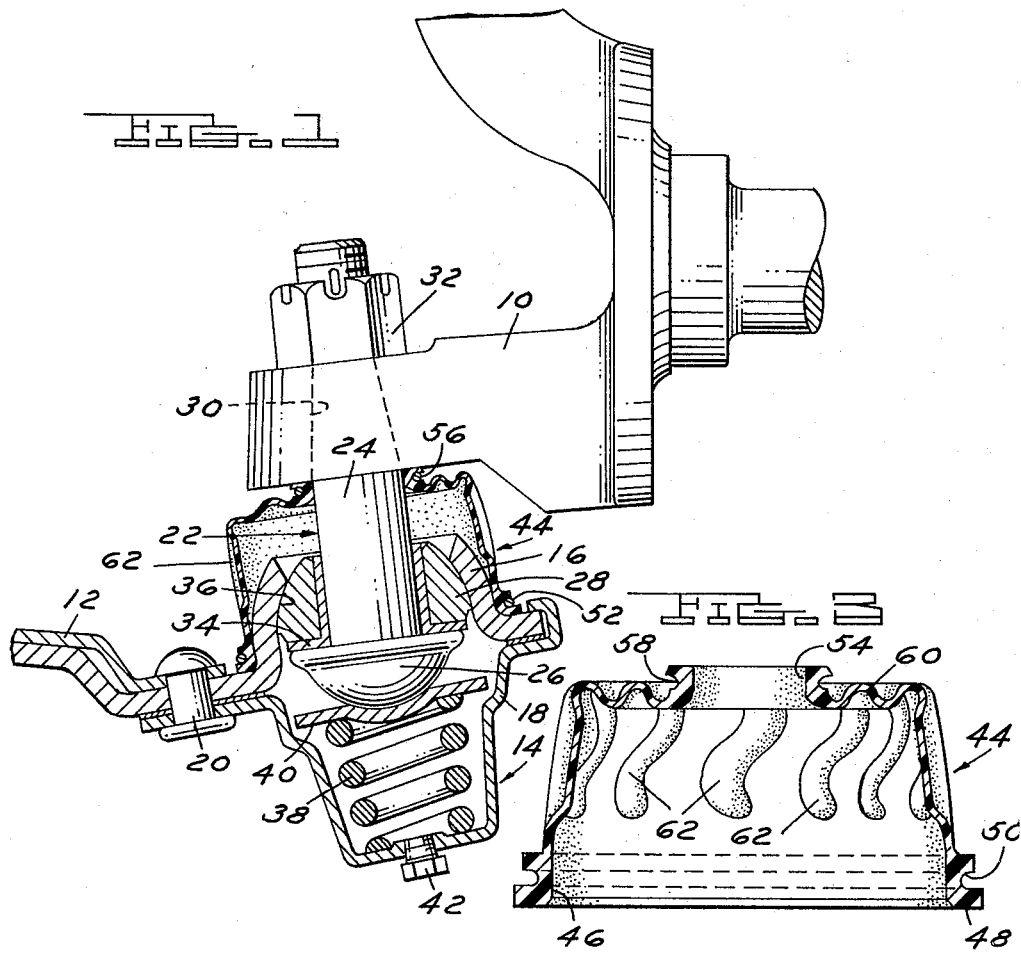
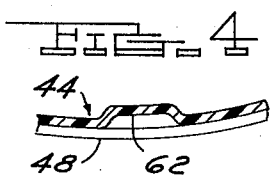
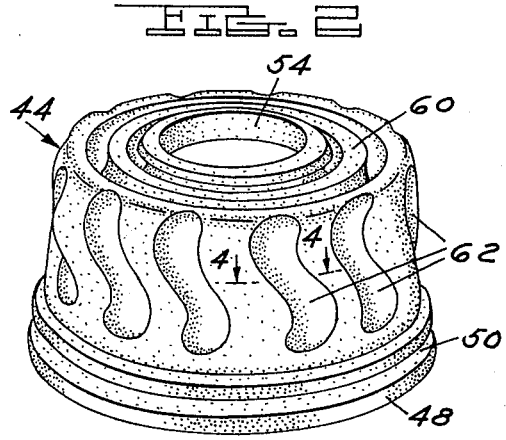
WALTER BERGMAN
INVENTOR
BY John R. Faulkner
Clifford L. Sadler
ATTORNEYS United States Patent Office 3,279,832
Patented Oct. 18, 1966

The present invention relates generally to ball and socket type joints, and more particularly to means for sealing such constructions.

Ball and socket joints provide an articulated connection between two relatively movable members. It is common practice to provide joints of this type in vehicle suspension systems such as at the connection between the suspension arms and the wheel spindle. Ball joints are also used in the steering linkage.

A ball joint usually comprises a spherical or semispherical socket and a stud with a one- or two-piece spherical head that is seated in the socket. The joints are lubricated with grease to permit low friction movement. In order to retain the lubricant within the socket and prevent the entry of dirt that might damage the bearing surfaces, a boot type seal is usually provided. A boot seal is usually formed of a flexible material such as rubber in an annular shape with a small opening at one end and a large opening at the other. The small end is in sealed engagement with the stud while the large end is in sealed engagement with the socket.

In automotive suspension systems, it has become a practice to provide ball and socket joints that are charged with a grease of improved quality that will retain good lubricating characteristics for extended usage beyond the heretofore conventional 1000-mile servicing. In order to realize the advantages of a ball joint construction having such lubrication, superior means must be provided to retain the grease and to prevent its contamination.

In accordance with this need, it is an object of the present invention to provide a boot type seal for a ball joint having superior sealing characteristics.

Further objects and advantages of the present invention will be more fully comprehended from the following discussion and the accompanying drawings, in which:

FIGURE 1 is an elevational view, partly in section, of a portion of a vehicle suspension system having a ball joint seal constructed in accordance with this invention;

FIGURE 2 is a perspective view of the ball joint seal of FIGURE 1;

FIGURE 3 is an elevational view, in section, of the seal of FIGURE 2; and

FIGURE 4 is an enlarged sectional view taken along section lines 4—4 of FIGURE 2.

Referring now to the drawing for a complete understanding of the invention, FIGURE 1 discloses a portion of a vehicle suspension that includes a wheel spindle 10 and a suspension arm 12. A ball joint assembly 14 rotatably and tiltably connects the spindle 10 with the arm 12. The ball joint assembly 14 includes upper and lower socket portions 16 and 18 that are secured to the end of the arm 12 by rivets 20.

A stud member 22 has a shank portion 24 with a hemispherical head 26 at one end that is positioned within the socket portions 16, 18. An annular bearing member 28 cooperates with the head 26 to form the ball portion of the joint. The shank 24 of the stud 22 is fitted in a tapered hole 30 in the wheel spindle 10 and secured by a nut 32.

A hat-shaped washer 34 is interposed between the annular bearing member 28 and the head portion 26. The washer 34 forms a bearing to accommodate steering movement of the spindle 10 and the stud 22.

A hemispherical internal bearing surface 36 is provided by the socket portion 16 that is slidably engaged by the annular bearing member 28 to accommodate tilting motion of the joint during jounce and rebound suspension movement.

A coil spring 38 and a washer 40 preload the joint 14 and keep the bearing surfaces in their proper position. A threaded plug 42 is provided in the end of the socket portion 18 to permit the ball joint assembly 14 to be charged with a lubricant.

A flexible boot seal assembly 44 surrounds the socket portion 16 and stud 22. It is the purpose of this seal to retain lubricant within the ball joint assembly 14 and to prevent the entry of water, dirt and other contaminants.

The seal 44 is an annular member having a large opening 46 at one end that is surrounded by an enlarged lip 48. The lip is provided with a groove 50 that receives a snap ring 52. The ring 52 secures the large opening 46 in sealed engagement against the exterior of the upper socket part 16.

The seal 44 also has a small opening 54 that surrounds the shank 24 of the ball stud 22. It is secured to the stud by a snap ring 56 which fits in a groove 58 formed in the enlarged portion that surrounds the openings 54.

The stud 22 tilts about the center of the hemispherical surface 36 during jounce and rebound movement of the suspension. The stud 22 also rotates about its own axis during steering movement of the spindle 10. It is conventional practice to provide a sliding seal where the boot engages the stud of the ball joint. Considerable difficulty has been experienced, as evidenced by the volume of the prior art, in obtaining a satisfactory sliding seal. According to the present invention, the boot seal 44 is secured to the stud 22 and is molded in a shape to accommodate both the tilting and turning motion. The ring 56 secures the boot 44 to the stud and problems associated with running seals are eliminated.

The upper portion of the boot seal is provided with a series of radially spaced apart corrugations 60 that are arranged concentrically about the opening 54. These corrugations accommodate tilting of the stud 22. During jounce and rebound movement of the suspension, the corrugated portion 60 of the boot 54 will flex in a fashion whereby the rubber will not be stretched or distorted to cause fatigue failure.

The side wall portion of the boot seal 44 is molded in a fashion to accommodate flexing resulting from steering movement of the spindle 10. Such steering movement causes an angular displacement between the upper and lower ends of the boot 44.

A circumferential series of ogee depressions 62 are molded into the side wall of the boot seal 44. As indicated in FIGURE 4, which is an enlarged sectional view taken along section lines 4—4 of FIGURE 2, the depression 62 extends inwardly towards the center of the stud 22. Referring to the perspective view, FIGURE 2, when the upper end of the boot seal 44 is rotated in a clockwise fashion, the angular arrangement or inclination of the depressions 62 will be increased so that they will tend to overlay one another. When the upper end is turned in a counterclockwise fashion, the ogee depressions 62 tend to become more erect and straighten out. This unique configuration is such that steering movement of the spindle 10 and stud 22 will not cause the side wall of the boot seal 44 to stretch or otherwise produce fatigue failure.

Modifications and alterations of this invention may occur to those skilled in the art that will come within the scope and spirit of the following claims.

I claim:

1. A suspension arm, a wheel spindle, a ball joint assembly connecting said arm to said spindle for universal relative movement therebetween, said assembly comprising a socket part secured to said arm and a stud part secured to said spindle, a boot seal having a resilient body portion with a large open end secured about said socket part and a small open end secured about said stud, said seal having an upper portion comprising a radial series of annular corrugations arranged outwardly of said small end, said seal also comprising a side wall portion having a series of circumferentially spaced apart elongated depressions, said depressions extending downwardly from the outer edges of said corrugated upper portion and terminating at the lower end just above said large open end.

2. A ball joint assembly comprising a stud part and a socket part, a boot seal having a large open end secured about said socket part and a small open end secured about said stud, said seal having an upper portion comprising a radial series of annular corrugations arranged outwardly of said small end, said seal also comprising a side wall portion having a series of circumferentially spaced apart ogee depressions, said depressions extending downwardly from the outer edges of said corrugated upper portion and terminating at the lower end just above said large open end.

3. A ball joint assembly comprising a stud part and a socket part, a boot seal having a large open end secured about said socket part and a small open end secured about said stud, said seal having an upper portion comprising a radial series of annular corrugations arranged outwardly of said small end, said seal also comprising a side wall portion having a series of circumferentially spaced apart ogee depressions.

4. A ball joint assembly comprising a stud part and a socket part, a boot seal having a large open end secured about said socket part and a small open end secured about said stud, said seal having a flexible upper portion, said seal also comprising a side wall portion having a plurality of circumferentially spaced apart ogee depressions about the entire periphery thereof, said depressions extending substantially axially downwardly from the outer edges of said upper portion and terminating at the lower end just above said large open end and being inclined sufficiently relative to the longitudinal axis of the seal so that the depressions tend to overlay one another in one direction of rotation of the stud and tend to straighten out in the opposite direction of rotation of the stud.

5. A ball joint assembly comprising a stud part and a socket part, a boot seal having a large open end secured about said socket part and a small open end secured about said stud, said seal having a flexible upper portion, said seal also comprising a side wall portion having a plurality of circumferentially spaced apart ogee depressions about the entire periphery thereof, said depressions extending substantially axially downwardly from adjacent the upper portion to adjacent the large open end and being inclined sufficiently relative to the longitudinal axis of the seal so that the depressions tend to overlay one another in one direction of rotation of the stud and tend to straighten out in the opposite direction of rotation of the stud.

References Cited by the Examiner

UNITED STATES PATENTS

| | | | |
|---|---|---|---|
| 1,734,624 | 11/1929 | Harrison | 74—18.2 X |
| 1,959,259 | 5/1934 | Zerk. | |
| 2,304,732 | 12/1942 | Flumerfelt. | |

FOREIGN PATENTS 1,301,669   7/1962   France.

CARL W. TOMLIN, *Primary Examiner.*

A. V. KUNDRAT, *Assistant Examiner.*